United States Patent [19]
Yamashita et al.

[11] Patent Number: 4,792,244
[45] Date of Patent: Dec. 20, 1988

[54] CERAMIC BEARING CONSTRUCTION

[75] Inventors: Yuko Yamashita, Tokorozawa; Yuji Masumoto, Kokubunji; Takao Kimura, Tanashi; Katsutoshi Nishida; Koichi Inoue, both of Yokohama; Kazuo Rokkaku, Osaka; Hiroaki Takebayashi, Osaka, all of Japan

[73] Assignees: Ishikawajima-Harima Jukogyo Kabushiki Kaisha; Kabushiki Kaisha Toshiba; Koyo Seiko Kabushiki Kaisha, all of Japan

[21] Appl. No.: 166,894

[22] Filed: Mar. 11, 1988

[30] Foreign Application Priority Data

Apr. 13, 1987 [JP] Japan .................................. 62-90375

[51] Int. Cl.⁴ ............................................. F16C 19/04
[52] U.S. Cl. ................................. 384/492; 384/537; 384/585; 384/907.1; 384/540
[58] Field of Search ............... 384/492, 537, 585, 584, 384/540, 907.1, 913

[56] References Cited

U.S. PATENT DOCUMENTS

| | | | |
|---|---|---|---|
| 2,158,156 | 5/1939 | Schröder | 384/492 |
| 3,097,897 | 7/1963 | Taylor | 384/492 |
| 4,611,933 | 9/1986 | Hofmann et al. | 384/537 |
| 4,671,680 | 6/1987 | Hauser et al. | 384/537 |

Primary Examiner—Lenard A. Footland

[57] ABSTRACT

Cracking of a ceramic bearing fitted over a metal shaft is prevented by grooves on an inner periphery of a ceramic inner race and/or on an outer periphery of the metal shaft.

4 Claims, 2 Drawing Sheets

CERAMIC BEARING CONSTRUCTION

BACKGROUND OF THE INVENTION

The present invention relates to construction between a rotating metal shaft and an inner race of a ceramic bearing to be used in aircraft engines and other industrial rotary machines.

In the fields of aircraft engines and other industrial rotary machines, ceramic bearings have been proposed for use under high temperature and high-velocity severe operating conditions.

FIG. 1 shows one example of conventional ceramic bearings. A ceramic bearing d comprises an inner race b, an outer race c and a plurality of balls a interposed between the races b and c and is mounted to a metal shaft e. Metal taper rings f are interposed between the ceramic inner race b and the metal shaft e so as to absorb difference in thermal expansion between assembling and operation of the ceramic bearing to thereby prevent cracking of the latter.

In the ceramic bearing d of the type described above, difference in thermal expansion between the ceramic inner race b and the metal shaft e is absorbed by axial displacement of the taper rings f, whereby circumferential and radial stresses which may cause cracking of the ceramic inner race b are reduced to moderate values.

However, the ceramic bearing of the type described above has the following problems and defects unsolved:

(a) Due to friction caused by an initial tightening force between the ceramic inner race b and the metal shaft e, the taper rings f may cause sticking and fail to be axially displaced, resulting in low reliability of the ceramic bearings.

(b) Positioning of the paired taper rings f with respect to each other is difficult to carry out.

(c) The taper ring f and tapered portions of the ceramic inner race b must be machined with high accurate dimension so that a number of component parts which requires machining with high accurate dimension is increased, resulting in increase of cost for the ceramic bearings.

The present invention was made to overcome the above and other problems encountered in the conventional ceramic bearings and has for its object to provide a ceramic bearing in which, without increase of component parts, circumferential and radial stresses caused by difference in thermal expansion between the ceramic inner race and the metal shaft can be relieved to thereby prevent cracking of the ceramic inner race.

The above and other objects, effects, features and advantages of the present invention will become more apparent from the following description of preferred embodiments thereof taken in conjunction with the accompanying drawings.

DETAILED DESCRIPTION OF THE PREFERRED EMBODIMENTS

Figure 1:
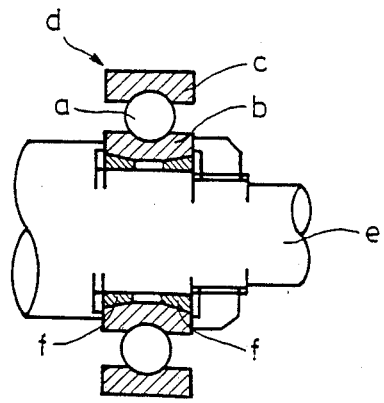
FIG. 1 is a sectional side view of a conventional ceramic bearing.
Figure 2:
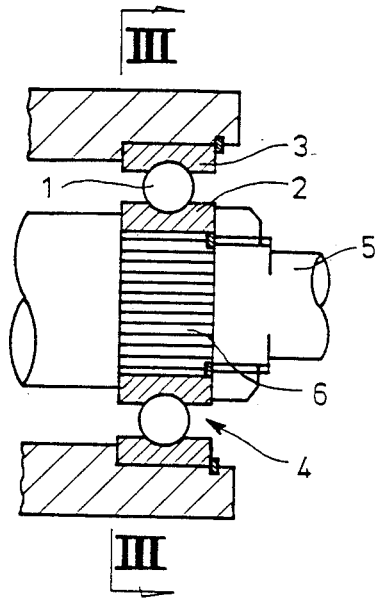
FIG. 2 is a sectional side view of a preferred embodiment of the present invention.
Figure 3:
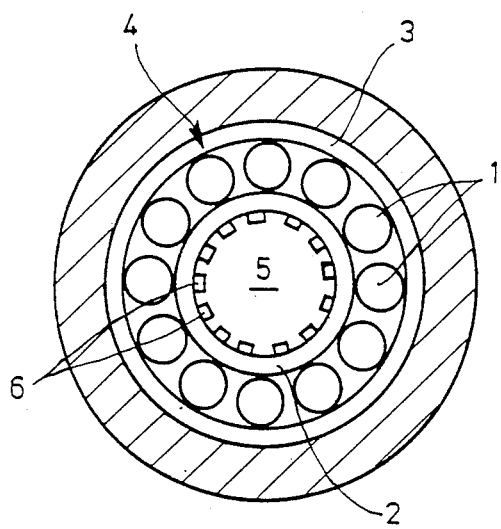
FIG. 3 is a sectional view taken along line III—III in FIG. 2.

Referring to FIGS. 2 and 3, a preferred embodiment of the present invention will be described. A ceramic bearing 4 comprises a ceramic inner race 2, a ceramic outer race 3 and a plurality of balls 1 interposed therebetween and is shrinkage-fitted over a metal shaft 5 to be securely held in position. More specifically, for prevention of the ceramic inner race 2 from being separated away from the metal shaft 5 during assembling or operation, the outer diameter of the metal shaft 5 is selected to be slightly greater than the inner diameter of the ceramic inner race 2 and they are assembled to each other by heating the ceramic bearing 4 and then fitting the same over the metal shaft 5.

In this case, a plurality of equidistantly spaced-apart grooves 6 are previously machined in parallel with the axis of the metal shaft 5 on the outer periphery of the metal shaft 5 and/or on the inner periphery of the ceramic inner race 2 and then the ceramic bearing 4 is shrinkage-fitted over the metal shaft 5.

Figure 4A:
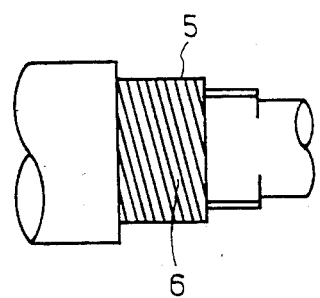
FIGS. 4(A) and 4(B) are views used to explain the cases where grooves in the form of screw threads are machined on the outer periphery of a metal shaft and on the inner periphery of a ceramic inner race, respectively.
Figure 4B:
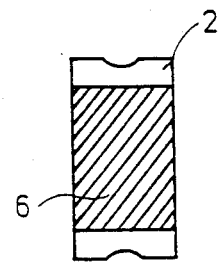
Figure 5A:
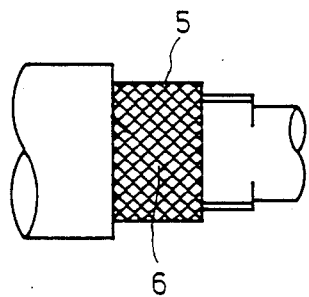
FIGS. 5(A) and 5(B) are views used to explain the grooves in the form of cross stripes on the outer periphery of the metal shaft and on the inner periphery of the ceramic inner race, respectively.
Figure 5B:
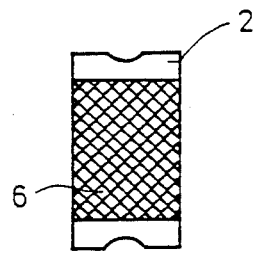

The grooves 6 may be in the form of serrations, knurls, teeth, screw threads, cross stripes and the like. FIGS. 4(A) and 4(B) show the cases where the grooves 6 in the form of screw threads are formed on the outer periphery of the metal shaft 5 and on the inner surface of the ceramic inner race 2, respectively. FIGS. 5(A) and 5(B) show the cases where the grooves 6 in the form of cross stripes are formed on the outer periphery of the metal shaft 5 and on the inner periphery of the ceramic inner race 2, respectively.

As mentioned above, the grooves 6 may be machined on the outer periphery of the metal shaft 5 or on the inner periphery of the ceramic inner race 2 or on both of the peripheries.

The metal shaft 5 and the ceramic bearing 4 shrinkage fitted thereover rise in temperature during operation. In this case, the metal shaft 5 tends to become larger in diameter and the ceramic inner race 2 tends to resist such thermal expansion of the metal shaft 5 since the thermal expansion rate of metal is about three times as high as that of ceramics. As a consequence, the circumferential and radial stresses between the ceramic inner surface 2 and the metal shaft 5 would be increased and exceed an allowable limit if no countermeasure is taken, causing cracking of the latter. According to the present invention, though the ceramic inner race 2 are in direct contact with the metal shaft 5, the surface area of contact between them is decreased owing to the grooves 6 so that the circumferential and radial thermal stresses due to the difference in thermal expansion during assembling and operation can be relieved, dissipated and reduced. Reduction of the thermal stresses contributes to maintain enough mechanical strength of the ceramic bearing against impacts and vibrations.

Effects, features and advantages of the ceramic bearing in accordance with the present invention may be summarized as follows:

(i) A most serious problem of ceramic bearings in use with practical machines, i.e., a cracking problem of the ceramic inner race due to thermal stresses, impacts, vibrations and so on during operation is overcome, thereby increasing durability of the ceramic bearings.

(ii) Conventional solutions against possible cracking of the ceramic bearings have been frequently unreliable. According to the present invention, circumferential and radial stresses of the ceramic bearings can be adjusted to moderate values so that reliability of the ceramic bearings can be remarkably improved.

(iii) Components parts which must be machined with a high accurate dimension can be decreased in number so that the costs for the ceramic bearings can be reduced.

What is claimed is:

1. A ceramic bearing construction comprising ceramic inner and outer races, a plurality of balls or rollers interposed between said inner and outer races, a metal shaft having an outer diameter slightly greater than an inner diameter of said ceramic inner race and grooves on an inner periphery of said ceramic inner race and/or on an outer periphery of said metal shaft, the ceramic inner race being shrinkage-fitted over the metal shaft and being securely held in position.

2. The construction according to claim 1 wherein said grooves are formed in parallel with an axis of said metal shaft.

3. The construction according to claim 1 wherein said grooves are in the form of screw threads.

4. The construction according to claim 1 wherein said grooves are in the form of cross stripes.

* * * * *